United States Patent [19]
Kurosawa

[11] Patent Number: 6,038,543
[45] Date of Patent: *Mar. 14, 2000

[54] COOPERATIVE WORK SUPPORTING METHOD AND SYSTEM THEREFOR

[75] Inventor: Takahiro Kurosawa, Kunitachi, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/658,996

[22] Filed: Jun. 4, 1996

[30] Foreign Application Priority Data

Jun. 6, 1995 [JP] Japan .................................. 7-139116

[51] Int. Cl.$^7$ .................................................. G06F 15/00
[52] U.S. Cl. .................................. 705/11; 705/1; 705/7; 705/8; 705/9; 705/10
[58] Field of Search .................................. 705/11, 1, 7, 8, 705/9, 10; 348/15, 20; 345/346; 204/270, 272; 364/468.18

[56] References Cited

U.S. PATENT DOCUMENTS

| | | | |
|---|---|---|---|
| 4,609,779 | 9/1986 | Rogers | 379/100 |
| 4,956,783 | 9/1990 | Teranishi et al. | 364/468.18 |
| 5,220,657 | 6/1993 | Bly et al. | 711/152 |
| 5,257,306 | 10/1993 | Watanabe | 348/15 |
| 5,337,407 | 8/1994 | Bates et al. | 345/331 |
| 5,346,306 | 9/1994 | Nitta | 348/15 |
| 5,374,952 | 12/1994 | Flohr | 348/12 |
| 5,511,187 | 4/1996 | Cragun | 707/8 |
| 5,546,324 | 8/1996 | Palmer et al. | 348/15 |
| 5,675,374 | 10/1997 | Kohda | 348/15 |
| 5,974,173 | 11/1990 | Stefik et al. | 364/521 |

*Primary Examiner*—Eric W. Stamber
*Assistant Examiner*—Romain Jeanty
*Attorney, Agent, or Firm*—Fitzpatrick, Cella, Harper & Scinto

[57] ABSTRACT

There is provided a cooperative work supporting method and a system therefor, for smooth progress of a cooperative work by evaluating the participation rate, of the level of participation of each participant to the cooperative work, and utilizing such participation rate in the cooperative work.

The cooperative work supporting method for use in a system for effecting a work by cooperation of plural participants, comprises determining a participation rate, indicating the level of participation to the cooperative work, for each participant; and informing each participant of such participation rate in an identifiable manner. Also the participation of the participant to the cooperative work is adjusted according to the participation rate. Also there is provided a prompt requesting the adjustment of the participation rate of each participant. The participation rate is determined by the data read-out frequency and/or the data write-in frequency of each participant in the cooperative work. In informing, the participation rate is made identifiable by a change in the number of colors of the image of each participant.

63 Claims, 8 Drawing Sheets

FIG. 6
LEVEL 8
LEVEL 4
LEVEL 7
LEVEL 3
LEVEL 6
LEVEL 2
LEVEL 5
LEVEL 1

COOPERATIVE WORK SUPPORTING METHOD AND SYSTEM THEREFOR

BACKGROUND OF THE INVENTION

1. Field of the Invention

The present invention relates to a cooperative work supporting method, for supporting appropriate participation by a group to a cooperative work in a group word environment (hereinafter called session), and a system therefor.

2. Related Background Art

The cooperative work by a group of plural persons is recently becoming popular, owing to the commercialization of high-performance computers and the advancement in the scattered calculation softwares. In the conventional cooperative work, however, the participation rate (level of participation of the individual person or terminal to the cooperative work) has not been utilized.

This is because, in the monofunctional cooperative work system such as the television conference system, plural cooperative works to not take place in parallel manner but the participants are always concentrated on a certain cooperative work, such as the conference. For this reason, in case of displaying the participants, it is customary to transfer and display the image entered from the table-top camera of each participant, without any modification. Also no adjustment is made on the participation rate.

In recent years, however, there is being developed a situation where a person participates in plural cooperative works, as the cooperative work by a group of plural persons can be realized on a computer system. Under such situation, the evaluation of the participation rate of each person in each cooperative work is an important factor in executing such cooperative work. Unless such evaluation is appropriately made and is utilized in the cooperative work, the proceeding of the work cannot be managed properly.

The absence of evaluation of the participation rate to the cooperative work leads to the following drawbacks:

1) The interest of the participant to the cooperative work cannot be understood;
2) In case of decision for example by voting, it cannot be discriminated whether such action has been completed;
3) It cannot be discriminated whether the provided real-time data have been received by the intended recipient;
4) It cannot be discriminated whether the remark has been received by the other participants; and
5) The participant cannot understand his role or position in the cooperative work.

SUMMARY OF THE INVENTION

The object of the present invention is to provide a cooperative work supporting method free from the aforementioned drawbacks and capable of appropriately evaluating the participation rate, or the level of participation of each participant to the cooperative work and utilizing such participation rate in the cooperative work, thereby ensuring smooth progress thereof, and a system therefor.

According to an embodiment of the present invention, there is provided a cooperative work supporting method in a system of work by cooperation of plural participants, capable of determining the participation rate, or the level of participation to the cooperative work, for each participant, and reporting the above-mentioned participation rate to each participant in an identifiable manner.

BRIEF DESCRIPTION OF THE DRAWINGS

FIG. 6 is photographs showing the difference, according to the participation rate, in the image of the participant shown on the display by the process shown in FIG. 5;

DESCRIPTION OF THE PREFERRED EMBODIMENTS

Now the present invention will be clarified in detail by an embodiment thereof, with reference to the attached drawings. The embodiment provides a group work supporting method which is featured by the adjustment of the presentation to the participant or of the participation rate, according to the participation rate which is evaluated by the frequency of access to the session or by the cumulative access time thereto. More specifically, there is explained the evaluation of the participation rate in a cooperative editing work participated by plural persons. In particular, the present embodiment provides an example of evaluating the participation rate in relative manner by the number of speeches to the cooperative editing work and presenting the participation rate by the number of colors used in the display of the image of the participants of the session. In the following there will be at first explained the configuration of system and then the working sequence thereof.

[Example of system configuration]

Figure 1:
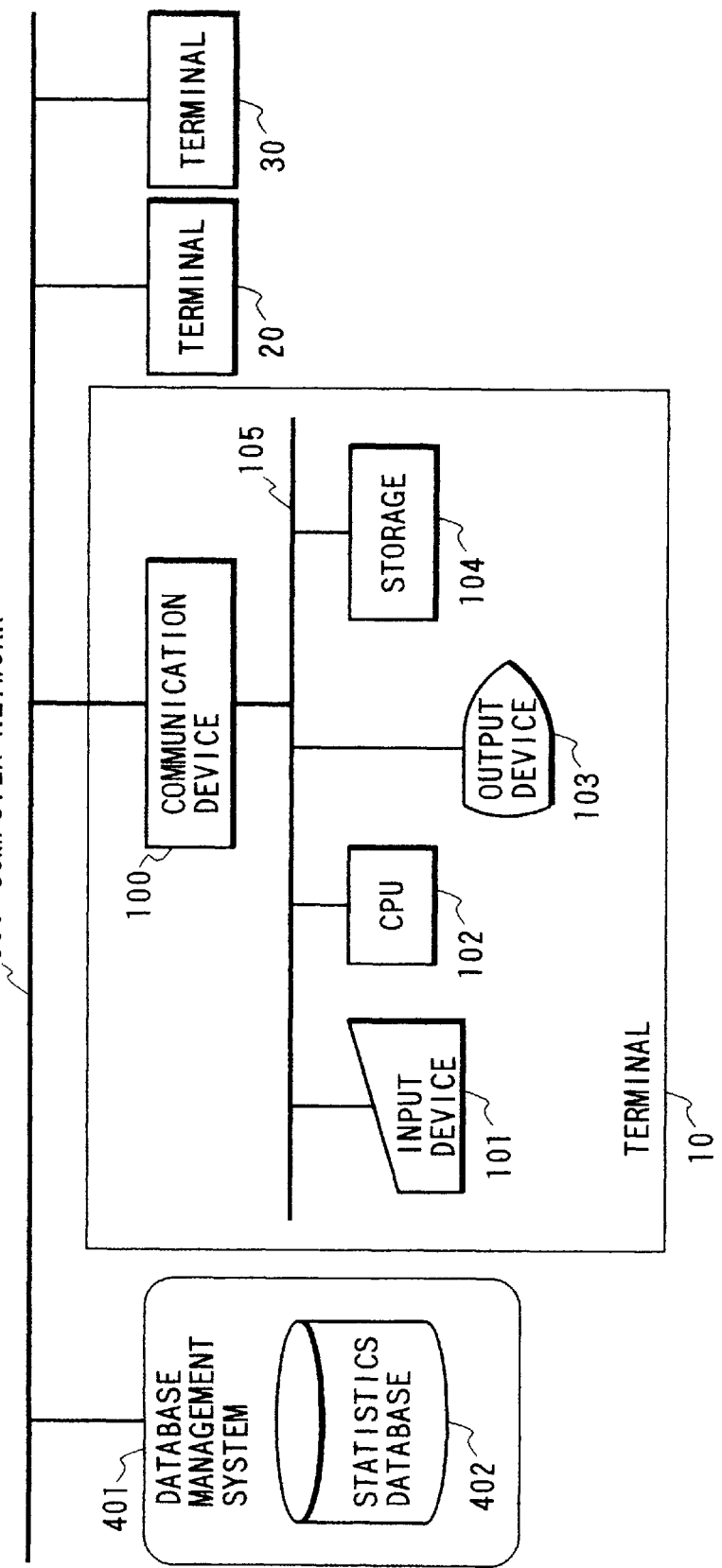
FIG. 1 is a view showing the configuration a system embodying the present invention.

FIG. 1 shows an example of the system configuration of the present embodiment.

Each of terminals 10, 20, 30 for the cooperative editing work is composed of components 100 to 150 to be explained later, and effects input/output and process for the cooperative work for each participant. In the following there will be explained an example employing three terminals, but the number of the terminals may be two, four or larger. A database management system 401 contains a statistical information database 402, including various statistics relating to the cooperative work. Communication means 500, for realizing the cooperative editing work, to be explained in the following, among plural computers, is composed for example of Ethernet or FDDI. In the present embodiment, the communication means is composed of a computer network, because the embodiment itself assumes the use of general-purpose computers, but there may also be employed a wide-area network such as ISDN.

In the following there will be explained the components constituting the terminals 10 to 30.

A communication device 100 is composed for example of an FDDI controller for connection to the computer network. An input device 101, to be used by the user of a program functioning on this embodiment, for entering various commands and data, is for example a keyboard, a mouse, a pad or a microphone. A CPU 102 executes programs of the cooperative editing work of the present embodiment and of evaluation of the participation rate. The present embodiment utilizes a CPU for these programs, but there may also be adopted a hardware configuration in which the independent CPU's are used respectively for these programs.

An output device 103, composed for example of a CRT display or a projector, is used for presenting, to the user, the content of the cooperative editing work of this embodiment and the result of evaluation of the participation rate. A single display device is used for the cooperative editing work and for the presentation of the participation rate for the purpose of simplicity, but there may also be employed independent display devices for these purposes.

A memory device 104 stores the programs for the cooperative editing work the evaluation and presentation of the participation rate, and the data utilized by these programs. A single memory device is shown for the purpose of simplicity, but there may also be employed different memory devices respectively for the different objects of memory, or a hierarchic memory device including a secondary memory device such as a hard disk. As an example, the memory device may be divided into a main memory device for storing data to be used temporarily and a secondary memory device for permanently storing a large amount of data. It may also include a read-only memory device, such as a ROM, for permanent data storage regardless of the state of the apparatus. A computer bus 105 connects the components 100 to 104 mentioned above.

Figure 2:
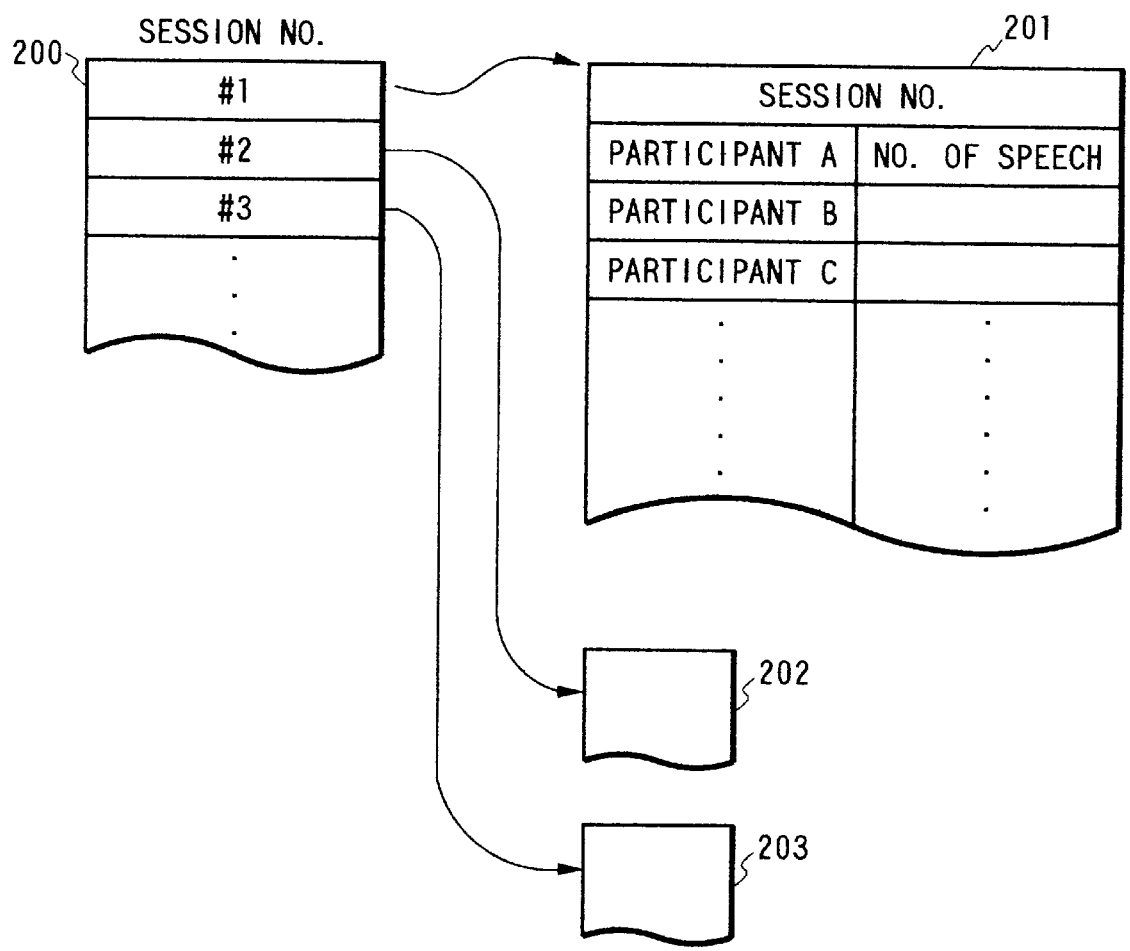
FIG. 2 is a view showing an example of a speech number table employed in the above-mentioned embodiment.

FIG. 2 shows an example of a table accumulating the number of speeches of each participant, corresponding to each session in this embodiment. The table shown in FIG. 2 may be stored in the statistical information database 402 or in the memory device of one of the terminals and renewed in response to each speech of the participant, and the display in each terminal may be controlled by referring to this table. Otherwise, the speech of the participant may be transmitted to the terminals so as to store a same table in the memory devices of the terminals, and the display in each terminal may be controlled by referring to its table.

A session number table 200 stores pointer addresses, corresponding to the session numbers specifying the plural sessions executed by the present system. A speech number table 201 stores the numbers of speeches, corresponding to the participants a, b, c, . . . , participating in a session number #1 of the session number table. Similar speech number tables 202, 203 are provided for the session numbers #2 and #3.

This table may be present independently from the program of each session as shown in FIG. 2, or may belong to the program of each session.

[Example of system function]

In the following there will be explained the work sequence of the system of the present embodiment.

Figure 3:
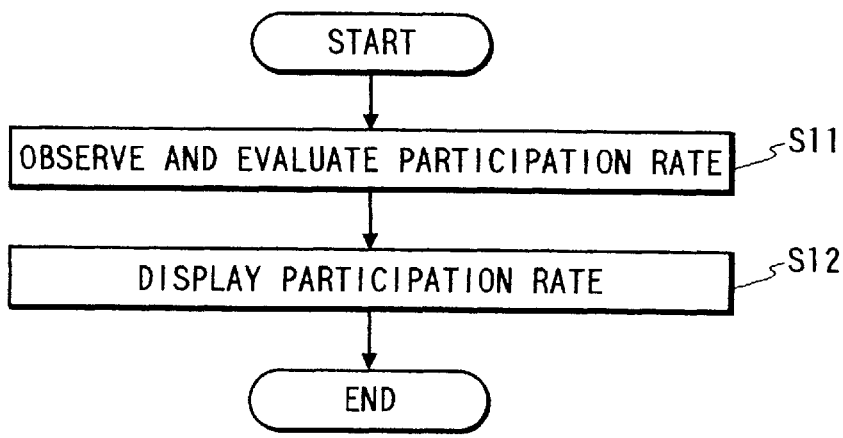
FIG. 3 is a flow chart showing the process for displaying the participation rate.

At first, FIG. 3 shows the procedure of evaluating the participation rate in the cooperative editing work functioning on the system configuration mentioned above:

(S11) effects observation and evaluation of the participation rate of each participant to the cooperative editing work;

(S12) presents thus obtained participation rate of each participant, for recognition by each participant.

In the following there will be explained an example of using a same presentation of the participation rate to all the participants, but the method of presentation of the participation rate may be selected independently for each participant.

In the following there will be given a detailed explanation on each of the operations outlined above, with reference to flow charts if necessary.

Figure 4:
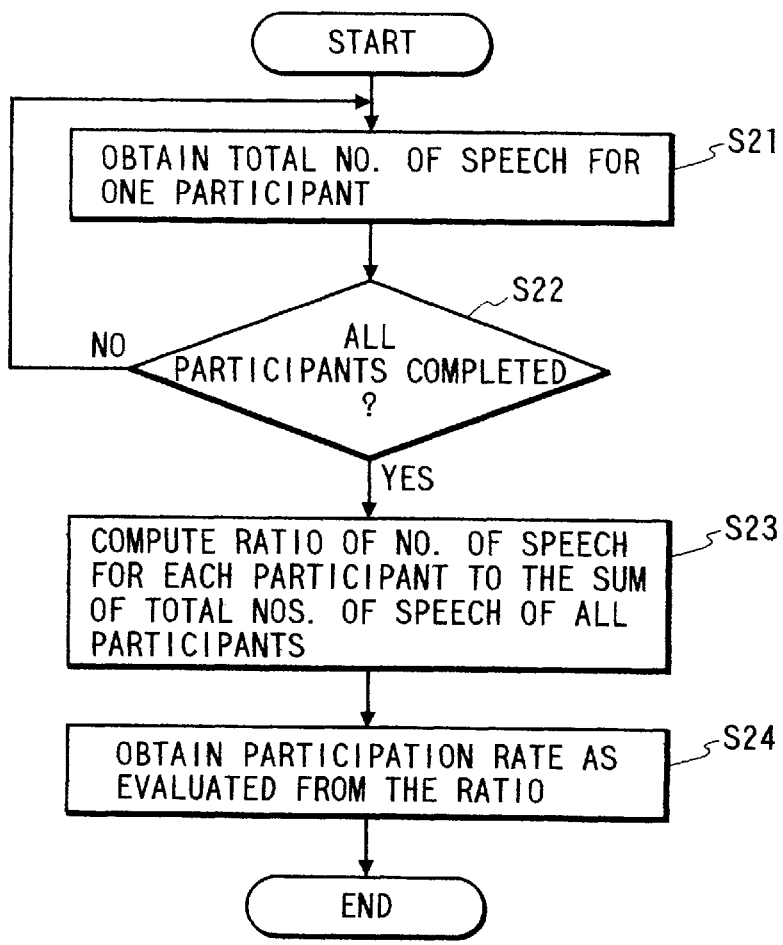
FIG. 4 is a flow chart showing the process for evaluating the participation rate.

[Example of evaluation of participation rate: FIG. 4]

In the following there will be explained an example of utilizing the number of speeches at the cooperative editing work, as the criterion of evaluation:

(S21) obtains the cumulative number of speeches of the participant, from the statistical information database 402 of this cooperative editing work;

(S22) applies the above-mentioned step S21 to all the participants;

(S23) determines the ratio of the number of speeches of each participant, to the sum of the cumulative numbers of speeches of all the participants;

(S24) determines the participation rate of each participant, based on the ratio determined in the step S23 and converting the sum of the cumulative numbers of speeches of all the participants as "100".

[Other examples of criterion on evaluation]

In the foregoing example, the participation rate is evaluated in each cooperative work (session) in relative manner, based on the cumulative number of speeches of the participant, but there can also be conceived other criteria of evaluation as exemplified in the following:

1) Timing of participation to the cooperative work, such as "participation rate is higher if the participation is made earlier;

2) Ratio of speeches to read-outs, such as the participation rate is low for a participant who does not speak but only reads;

3) Cumulative participation time to the cooperative work, such as the participation rate is higher for a longer participation time;

4) Ratio to the cumulative participation time to other cooperative works, such as the participation rate is higher if the ratio of the cumulative participation time in this cooperative work is higher than that in another cooperative work.

[Other examples of evaluating method]

Other evaluating methods, such as those shown in the following, are also similarly applicable:

1) An absolute evaluation is employed instead of the relative evaluation within a cooperative work. For example, the participation rate is high for a participant if the number of his speeches exceeds 8 in a cooperative work;

2) The evaluation is not made by the cumulative value, but by the value within a time frame. For example, the participation rate is high for the three participants who are highest in the number of speeches within the recent 3 hours in the cooperative work.

Figure 5:
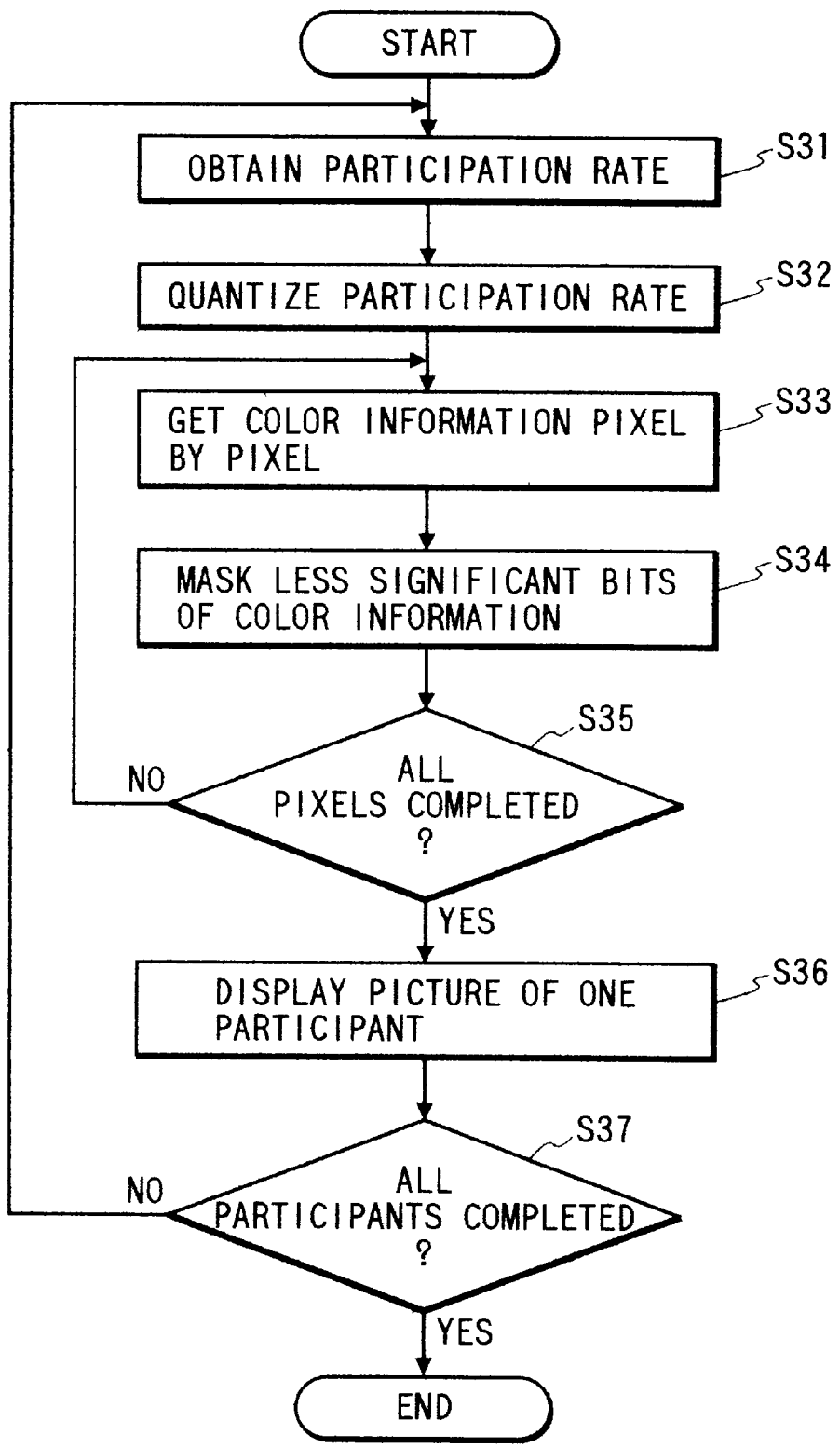
FIG. 5 is a flow chart showing the process of displaying the participation rate.

[Example 1 of presentation of participation rate: FIG. 5]

In the following there will be explained an example of utilizing, as the means of presentation, the display device for displaying the image of the participant. In particular, there will be explained an example of displaying the image of the participant with a number of colors corresponding to the participation rate (FIG. 5):

(S31) obtains the participation rate;

(S32) digitizes the participation rate into 8 levels, from level 1 to level 8 corresponding to the incase in the participation rate. In this example there is assumed a participation rate "84", which is digitized into a level 7;

(S33) obtains, for each pixel, the color information of 8 bits in each of R, G and B colors;

(S34) masks the lower bits of the color information, according to the digitized level of the participation rate, as shown in the following table. In the present example, the lowest 1 bit is masked as the participation rate is level 7;

TABLE 1

| Participation rate | Number of lower bits to be masked |
| --- | --- |
| Level 8 | 0 |
| Level 7 | 1 |
| Level 6 | 2 |
| Level 5 | 3 |
| Level 4 | 4 |
| Level 3 | 5 |
| Level 2 | 6 |
| Level 1 | 7 |

(S35) applies the process of the steps S33 and S34 to all the pixels constituting the image of the participant;

(S36) displays the image of the participant with thus obtained number of colors, corresponding to the participation rate;

(S37) applies the process of the steps S31 to S36 to all the participants of the cooperative work.

By the display in the above-explained manner of the image of the participant with the number of colors corresponding to the participation rate, the image of an active participant can be clearly seen as indicated in the level 8 in FIG. 6, while the image becomes progressively unclear as the participation rate becomes lower (levels 7 to 1 in FIG. 6). It is thus rendered possible to provide each participant with his participation rate in visible manner.

In the present embodiment, the participation rate is presented in the display of the image of the participant, but it can also be presented by the display of a number representing the participation rate, by a color spectrum from red to blue, by a histogram, or by a change in the sampling rate of the voice.

Also in displaying the image of the participant, there can be conceived, in addition to the mapping method to the number of colors explained in the foregoing, a change in the color or size of the display frame, a change in zooming ratio, a change in the number of frame in a moving image, a change in the pixel density or a change in the timing of voice synchronization.

Figure 7:
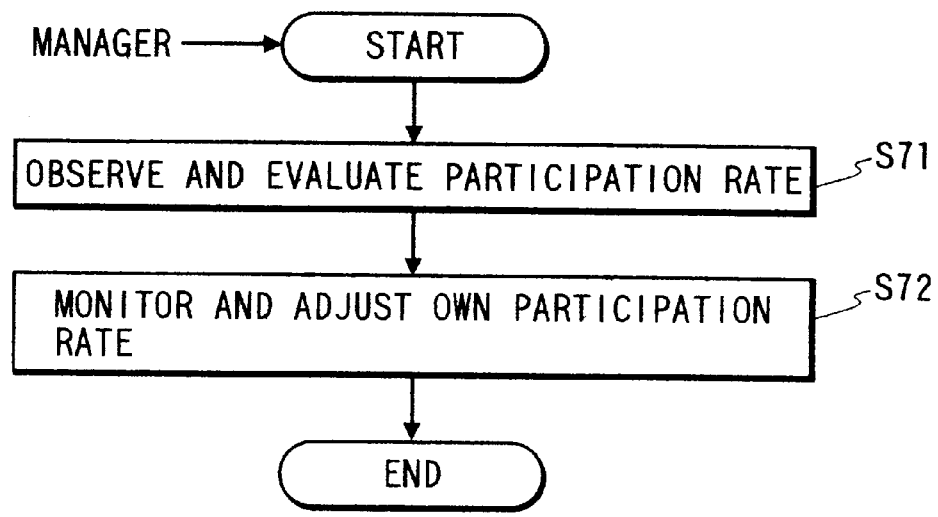
FIG. 7 is a flow chart showing the process of adjusting the participation rate.

[Example of adjustment of participation rate: FIG. 7]

This embodiment is featured by adjusting means for adjusting the participation rate of the participant, in order to achieve smooth progress of the ensuing cooperative work, utilizing thus obtained participation rate. In the following there will be explained an adjustment method for use in an exclusive cooperative editing work, inhibiting the participation to other sessions. More precisely, the participation rate of the participant in a cooperative editing work is monitored, and, if it is lower than a predetermined value, the speech in other sessions is inhibited:

(S71) observes and evaluates the participation rate of the participant himself in the cooperative editing work;

(S72) monitors the participation rate of the participant himself and adjusts the participation rate if necessary.

The participant monitors his participation rate in the foregoing embodiment, but he may monitor the participation rate of another participant or the participation rates of all the participants. Thus, in case the activity of the cooperative editing work becomes dull, the situation can be coped with by the adjustment of the participation rate.

Figure 8:
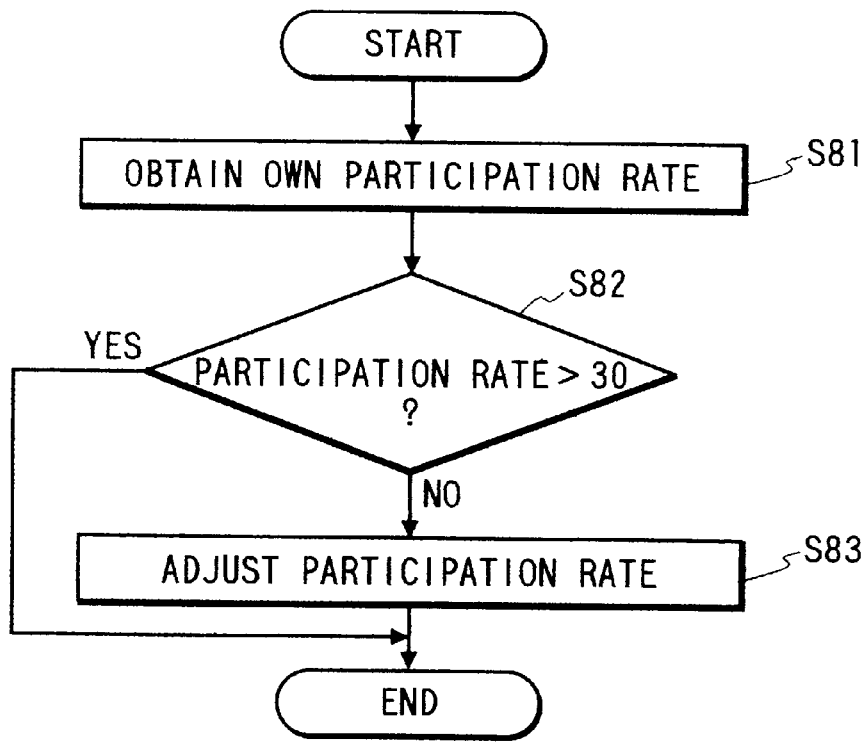
FIG. 8 is a flow chart showing the process of monitoring the participation rate.

[Example of monitoring of participation rate: FIG. 8]

In the following example, it is assumed that a number "30" is designated in advance as the lower limit of the participation rate:

(S81) obtains the participation rate of the participant himself, from the participation rates obtained by the evaluation;

(S82) does not interfere with the proceeding if the participation rate is larger than "30";

(S83) if not, activates an adjusting procedure to be explained in the following.

Figure 9:
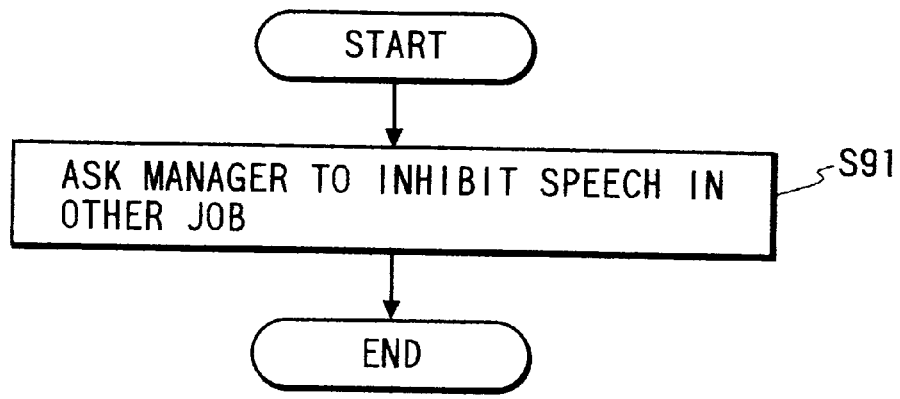
FIG. 9 is a flow chart showing the process of adjusting the participation rate.

[Example of adjustment of participation rate: FIG. 9]

For adjusting the participation rate of the participant to the cooperative editing work, there is forced an operation relating thereto. In this embodiment, there is assumed an exclusive cooperative work, and the speech in other sessions is inhibited:

(S91) asks the manager of the cooperative work, managing the cooperative work, to terminate the right of speech in other cooperative works.

In the foregoing there is assumed an exclusive cooperative work in which the speech to other sessions is inhibited, but there can also be easily conceived an adjusting method of inhibiting not only the speech but also the access to other sessions, an adjusting method of forcing the participants to participate in the cooperative work, such as in case of an urgently called conference.

There can also be conceived an adjusting method of holding two participation rates as the parameters of monitoring, and adjusting the right of speech only at the first level and the right of access also at the second level. Also in the foregoing description, it is assumed that each participant adjusts his participation rate, but it is also conceivable to adjust the participation rates of other participants under suitable managing right. Also in the foregoing description, there is explained the forcing of adjustment of the participation rate, but it is also possible to present a prompt to each participant, requesting his adjustment of the participation rate.

[Example of display of participation rates in plural sessions]

In this embodiment, the obtained participation rates are presented to the participant in the readily understandable form of a bar graph, corresponding to all the cooperative works. This embodiment can be achieved by varying the presentation of the foregoing embodiment to a bar graph as explained in the following.

Figure 10:
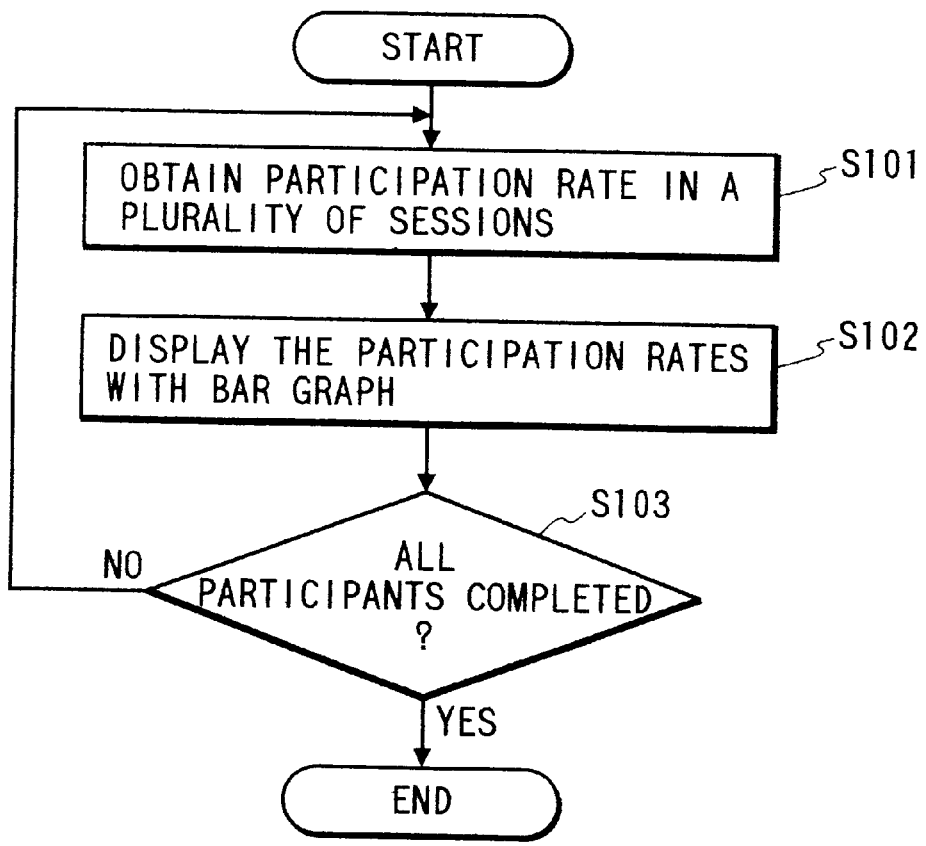
FIG. 10 is a flow chart showing another process of displaying the participation rate.

[Example 2 of presentation of participation rate: FIG. 10]

In the following there will be explained an example of displaying the participation rates of the participant, corresponding to the cooperative works, in a bar graph;

(S101) obtains the participation rates in plural sessions;

(S102) displays the participation rates of the plural sessions in a bar graph;

(S103) applies the process of the steps S101 and S102 to all the participants of the cooperative works.

Figure 11:
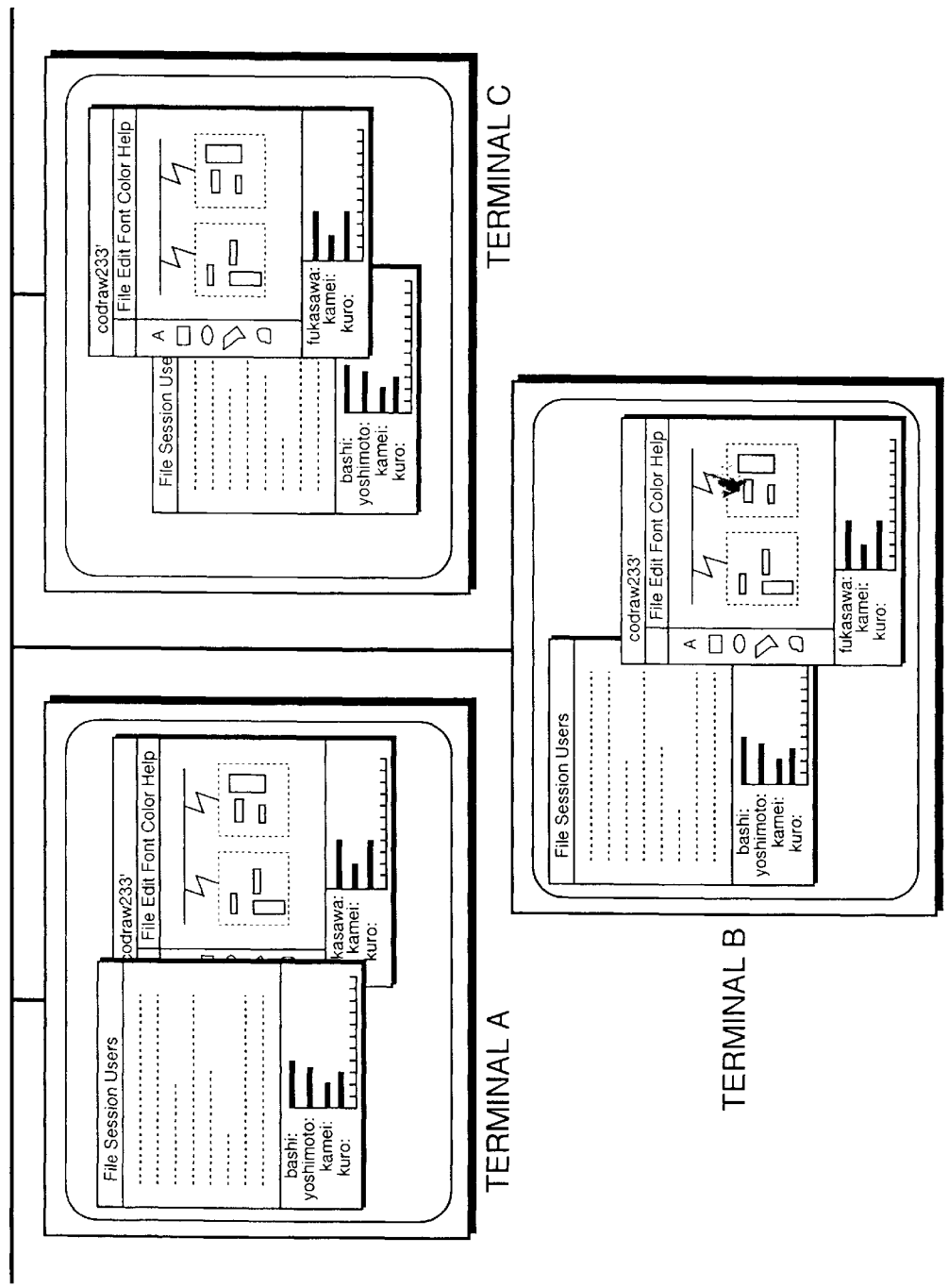
FIG. 11 is a view showing the result of the displaying process shown in FIG. 10.

Therefore, even in case plural participants simultaneously participate in plural cooperative works, each participant can easily understand the action states in such cooperative works, by the display of the participation rates as shown in FIG. 11.

In the foregoing embodiments there is provided a speech number table for cumulatively storing the number of speeches, but similar data may be retrieved from the statistical information database 402 at the re-start of each session. Also the present invention is naturally applicable not only to a system consisting of plural equipment but also an apparatus consisting solely of a single equipment, and further to a case where the present invention is realized by the supply of a program to a system or an apparatus.

As explained in the foregoing, the present invention enables smooth progress of a cooperative work, by adequately evaluating the level of participation of each participant to the cooperative work (i.e. participation rate) and utilizing such participation rate in the cooperative work.

What is claimed is:

1. A cooperative work supporting method for use in a system for effecting a cooperative work by cooperation of a plurality of participants at respective computer terminals connected to a computer network, wherein the computer terminals communicate to the plurality of participants a status of the plurality of participants in connection with their participation in the cooperative work in order to affect their participation in the cooperative work, said method comprising the steps of:

determining a participation rate, indicating a level of participation in the cooperative work, for each participant of the plurality of participants at their respective computer terminals, wherein the cooperative work is a common, single work cooperated on by all the participants who participate in the cooperative work by transmitting information among the computer terminals via the computer network; and informing each participant of the plurality of participants at their respective computer terminals of the participation rate in an identifiable manner.

2. A cooperative work supporting method according to claim 1, wherein the level of participation of a participant in the cooperative work is adjusted according to the participation rate.

3. A cooperative work supporting method according to claim 1, wherein the participation rate is determined based on a frequency of data read-out of each participant of the plurality of participants in the cooperative work.

4. A cooperative work supporting method according to claim 1, wherein the participation rate is determined based on a frequency of data write-in of each participant of the plurality of participants in the cooperative work.

5. A cooperative work supporting method according to claim 1, wherein the participation rate is determined based on a frequency of data read-out and data write-in of each participant of the plurality of participants in the cooperative work.

6. A cooperative work supporting method according to claim 1, wherein the participation rate is determined based on a ratio of a frequency of data read-out and a frequency of data write-in of each participant of the plurality of participants in the cooperative work.

7. A cooperative work supporting method according to claim 1, wherein the participation rate is determined based on a cumulative participation time of each participant of the plurality of participants in the cooperative work.

8. A cooperative work supporting method according to claim 1, wherein the participation rate is determined based on a timing of participation of each participant of the plurality of participants in the cooperative work.

9. A cooperative work supporting method for use in a system for effecting a cooperative work by cooperation of a plurality of participants at respective computer terminals connected to a computer network, said method comprising the steps of:

determining a participation rate, indicating a level of participation in the cooperative work, for each participant of the plurality of participants at their respective computer terminals, wherein the cooperative work is a common, single work for all the participants; and informing each participant of the plurality of participants at their respective computer terminals of the participation rate in an identifiable manner, wherein the participation rate is determined based on a comparison of a participation of a participant in the cooperative work and that in other cooperative works.

10. A cooperative work supporting method according to claim 3, wherein the participation rate is determined from a value within a time frame.

11. A cooperative work supporting method according to claim 3, wherein the participation rate is determined based on a ratio of a participation status of each participant of the plurality of participants in the cooperative work and a participation status of all the participants.

12. A cooperative work supporting method according to claim 3, wherein the participation rate is determined based on a comparison of a participation rate of each participant of the plurality of participants in the cooperative work with a predetermined reference value.

13. A cooperative work supporting method for use in a system for effecting a cooperative work by cooperation of a plurality of participants at respective computer terminals connected to a computer network, said method comprising the steps of:

determining a participation rate, indicating a level of participation in the cooperative work, for each participant of the plurality of participants at their respective computer terminals, wherein the cooperative work is a common, single work for all the participants; and informing each participant of the plurality of participants at their respective computer terminals of the participation rate in an identifiable manner, wherein said informing is conducted by displaying an image specifying a participant, and one of color or size of a display frame, zooming level, number of colors in display, frame rate of a moving image, pixel density, delay in voice synchronization, and sound loudness is distinguishably selected according to the participation rate.

14. A cooperative work supporting method according to claim 1, wherein said informing is conducted by displaying the participation rate in a numeric presentation.

15. A cooperative work supporting method according to claim 1, wherein said informing is conducted by displaying a color spectrum corresponding to the participation rate.

16. A cooperative work supporting method according to claim 1, wherein said informing is conducted by displaying a bar graph corresponding to the participation rate.

17. A cooperative work supporting method for use in a system for effecting a cooperative work by cooperation of a plurality of participants at respective computer terminals connected to a computer network, said method comprising the steps of:

determining a participation rate, indicating a level of participation in the cooperative work, for each participant of the plurality of participants at their respective computer terminals, wherein the cooperative work is a common, single work for all the participants; and informing each participant of the plurality of participants at their respective computer terminals of the participation rate in an identifiable manner, wherein said informing is conducted by changing a voice sampling rate corresponding to the participation rate.

18. A cooperative work supporting method for use in a system for effecting a cooperative work by cooperation of a plurality of participants at respective computer terminals connected to a computer network, said method comprising the steps of:

determining a participation rate, indicating a level of participation in the cooperative work, for each participant of the plurality of participants at their respective computer terminals, wherein the cooperative work is a common, single work for all the participants; and informing each participant of the plurality of participants at their respective computer terminals of the participation rate in an identifiable manner, wherein the participation of a participant in the cooperative work is adjusted according to the participation rate, and the adjustment of the participation in the cooperative work varies the participation rate of the participant himself, thereby inhibiting or forcing access to a predetermined cooperative work.

19. A cooperative work supporting method for use in a system for effecting a cooperative work by cooperation of a plurality of participants at respective computer terminals connected to a computer network, said method comprising the steps of:

determining a participation rate, indicating a level of participation in the cooperative work, for each participant of the plurality of participants at their respective computer terminals, wherein the cooperative work is a common, single work for all the participants; and informing each participant of the plurality of participants at their respective computer terminals of the participation rate in an identifiable manner, wherein the participation of a participant in the cooperative work is adjusted according to the participation rate, and the adjustment of the participation in the cooperative work is to vary the participation rate of another participant, thereby inhibiting or forcing access to a predetermined cooperative work.

20. A cooperative work supporting method according to claim 18, wherein the adjustment of the level of participation in the cooperative work is to inhibit or force write-in in a first level and to inhibit or force read-out in a second level.

21. A cooperative work supporting method according to claim 1, further comprising the step of presenting, to each participant of the plurality of participants, a prompt requesting adjustment of a respective participation rate thereof.

22. A system for effecting a cooperative work by cooperation of a plurality of participants at respective computer terminals connected to a computer network, wherein the computer terminals communicate to the plurality of participants a status of the plurality of participants in connection with their participation in the cooperative work in order to affect their participation in the cooperative work, the system comprising:

participation rate calculating means for determining a participation rate, indicating a level of participation in the cooperative work, for each participant of the plurality of participants at their respective computer terminals, wherein the cooperative work is a common, single work cooperated on by all the participants who participate in the cooperative work by transmitting information among the computer terminals via the computer network; and informing means for informing each participant of the plurality of participants at their respective computer terminals of the participation rate in an identifiable manner.

23. A system according to claim 22, further comprising adjusting means for adjusting the level participation of a participant in the cooperative work according to the participation rate.

24. A system according to claim 22, wherein the participation rate is determined based on a frequency of data read-out of each participant of the plurality of participants in the cooperative work.

25. A system according to claim 22, wherein the participation rate is determined based on a frequency of data write-in of each participant of the plurality of participants in the cooperative work.

26. A system according to claim 22, wherein the participation rate is determined based on a frequency of data read-out and a frequency of data write-in of each participant of the plurality of participants in the cooperative work.

27. A system according to claim 22, wherein the participation rate is determined based on a ratio of a frequency of data read-out and a frequency of data write-in of each participant of a plurality of participants in the cooperative work.

28. A system according to claim 22, wherein the participation rate is determined based on a cumulative participant time of each participant of the plurality of participants in the cooperative work.

29. A system according to claim 22, wherein the participation rate is determined based on a timing of participation of each participant of the plurality of participants in the cooperative work.

30. A system for effecting a cooperative work by cooperation of a plurality of participants at respective computer terminals connected to a computer network, said system comprising:

participation rate calculating means for determining a participation rate, indicating a level of participation in the cooperative work, for each participant of a plurality of participants at their respective computer terminals, wherein the cooperative work is a common, single work for all the participants; and informing means for informing each participant of the plurality of participants at their respective computer terminals of the participation rate in an identifiable manner, wherein the participation rate is determined based on a comparison of a participation of a participant in the cooperative work and that in other cooperative works.

31. A system according to claim 24, wherein the participation rate is determined from a value within a time frame.

32. A system according to claim 24, wherein the participation rate is determined based on a ratio of participation of each participant of the plurality of participants in the cooperative work and a participation status of all the participants.

33. A system according to claim 24, wherein the participation rate is determined based on a comparison of a participation rate of each participant of the plurality of participants in the cooperative work with a predetermined reference value.

34. A system for effecting a cooperative work by cooperation of a plurality of participants at respective computer terminals connected to a computer network, said system comprising:

participation rate calculating means for determining a participation rate, indicating a level of participation in the cooperative work, for each participant of a plurality of participants at their respective computer terminals, wherein the cooperative work is a common, single work for all the participants; and informing means for informing each participant of the plurality of participants at their respective computer terminals of the participation rate in an identifiable manner, wherein said informing means is adapted to display an image specifying a participant, and one of color or size of a display frame, zooming level, number of colors in display, frame rate of a moving image, pixel density, delay in voice synchronization, and sound loudness is distinguishably selected according to the participation rate.

35. A system according to claim 22, wherein said informing means is adapted to display the participation rate in a numeric presentation.

36. A system according to claim 22, wherein said informing means is adapted to display a color spectrum corresponding to the participation rate.

37. A system according to claim 22, wherein said informing means is adapted to display a bar graph corresponding to the participation rate.

38. A system for effecting a cooperative work by cooperation of a plurality of participants at respective computer terminals connected to a computer network, said system comprising:

participation rate calculating means for determining a participation rate, indicating a level of participation in the cooperative work, for each participant of a plurality of participants at their respective computer terminals, wherein the cooperative work is a common, single work for all the participants; and informing means for informing each participant of the plurality of participants at their respective computer terminals of the participation rate in an identifiable manner, wherein said informing includes means for changing a voice sampling rate corresponding to the participation rate.

39. A system for effecting a cooperative work by cooperation of a plurality of participants at respective computer terminals connected to a computer network, said system comprising:

participation rate calculating means for determining a participation rate, indicating a level of participation in the cooperative work, for each participant of a plurality of participants at their respective computer terminals, wherein the cooperative work is a common, single work for all the participants;

informing means for informing each participant of the plurality of participants at their respective computer terminals of the participation rate in an identifiable manner; and adjusting means for adjusting the participation of a participant in the cooperative work according to the participation rate, wherein said adjusting means is adapted to vary the participation rate of the participant himself, thereby inhibiting or forcing access to a predetermined cooperative work.

40. A system for effecting a cooperative work by cooperation of a plurality of participants at respective computer terminals connected to a computer network, said system comprising:

participation rate calculating means for determining a participation rate, indicating a level of participation in the cooperative work, for each participant of a plurality of participants at their respective computer terminals, wherein the cooperative work is a common, single work for all the participants;

informing means for informing each participant of the plurality of participants at their respective computer terminals of the participation rate in an identifiable manner; and adjusting means for adjusting the participation of a participant in the cooperative work according to the participation rate, wherein said adjusting means is adapted to vary the participation rate of another participant, thereby inhibiting or forcing access to a predetermined cooperative work.

41. A system according to claim 39, wherein said adjusting means is adapted to inhibit or force write-in in a first level and to inhibit or force read-out in a second level.

42. A system according to claim 22, further comprising adjustment designation means for presenting, to each participant of the plurality of participants, a prompt requesting adjustment of a respective participation rate thereof.

43. A computer readable recording medium on which is recorded a computer program for implementing a cooperative work supporting method for use in a system for effecting a cooperative work by cooperation of a plurality of participants at respective computer terminals connected to a computer network, wherein the computer terminals communicate to the plurality of participants a status of the plurality of participants in connection with their participation in the cooperative work in order to affect their participation in the cooperative work, said program comprising:

code for determining a participation rate, indicating a level of participation in the cooperative work, for each participant of the plurality of participants at their respective computer terminals, wherein the cooperative work is a common, single work cooperated on by all the participants who participate in the cooperative work by transmitting information among the computer terminals via the computer network; and code for informing each participant of the plurality of participants at their respective computer terminal of the participation rate in an identifiable manner.

44. A computer readable recording medium according to claim 43, wherein the level of participation of a participant in the cooperative work is adjusted according to the participation rate.

45. A computer readable recording medium according to claim 43, wherein the participation rate is determined based on a frequency of data read-out of each participant of the plurality of participants in the cooperative work.

46. A computer readable recording medium according to claim 43, wherein the participation rate is determined based on a frequency of data write-in of each participant of the plurality of participants in the cooperative work.

47. A computer readable recording medium according to claim 43, wherein the participation rate is determined based on a frequency of data read-out and data write-in of each participant of the plurality of participants in the cooperative work.

48. A computer readable recording medium according to claim 43, wherein the participation rate is determined based on a ratio of a frequency of data read-out and a frequency of data write-in of each participant of the plurality of participants in the cooperative work.

49. A computer readable recording medium according to claim 43, wherein the participation rate is determined based on a cumulative participation time of each participant of the plurality of participants in the cooperative work.

50. A computer readable recording medium according to claim 43, wherein the participation rate is determined based on a timing of participation of each participant of the plurality of participants in the cooperative work.

51. A computer readable recording medium on which is recorded a computer program for implementing a cooperative work supporting method for use in a system for effecting a cooperative work by cooperation of a plurality of participants at respective computer terminals connected to a computer network, said program comprising:

code for determining a participation rate, indicating a level of participation in the cooperative work, for each participant of the plurality of participants at their respective computer terminals, wherein the cooperative work is a common, single work for all the participants; and code for informing each participant of the plurality of participants at their respective computer terminal of the participation rate in an identifiable manner, wherein the participation rate is determined based on a comparison of a participation of a participant in the cooperative work and that in other cooperative works.

52. A computer readable recording medium according to claim 45, wherein the participation rate is determined from a value within a time frame.

53. A computer readable recording medium according to claim 45, wherein the participation rate is determined based on a ratio of a participation status of each participant of the plurality of participants in the cooperative work and a participation status of all the participants.

54. A computer readable recording medium according to claim 45, wherein the participation rate is determined based on a comparison of a participation rate of each participant of the plurality of participants in the cooperative work with a predetermined reference value.

55. A computer readable recording medium on which is recorded a computer program for implementing a cooperative work supporting method for use in a system for effecting a cooperative work by cooperation of a plurality of participants at respective computer terminals connected to a computer network, said program comprising:

code for determining a participation rate, indicating a level of participation in the cooperative work, for each participant of the plurality of participants at their respective computer terminals, wherein the cooperative work is a common, single work for all the participants; and code for informing each participant of the plurality of participants at their respective computer terminal of the participation rate in an identifiable manner, wherein said informing is conducted by displaying an image specifying a participant, and one of color or size of a display frame, zooming level, number of colors in display, frame rate of a moving image, pixel density, delay in voice synchronization, and sound loudness is distinguishably selected according to the participation rate.

56. A computer readable recording medium according to claim 43, wherein said informing is conducted by displaying the participation rate in a numeric presentation.

57. A computer readable recording medium according to claim 43, wherein said informing is conducted by displaying a color spectrum corresponding to the participation rate.

58. A computer readable recording medium according to claim 43, wherein said informing is conducted by displaying a bar graph corresponding to the participation rate.

59. A computer readable recording medium on which is recorded a computer program for implementing a cooperative work supporting method for use in a system for effecting a cooperative work by cooperation of a plurality of participants at respective computer terminals connected to a computer network, said program comprising:

code for determining a participation rate, indicating a level of participation in the cooperative work, for each participant of the plurality of participants at their respective computer terminals, wherein the cooperative work is a common, single work for all the participants; and code for informing each participant of the plurality of participants at their respective computer terminal of the participation rate in an identifiable manner, wherein the informing is conducted by changing a voice sampling rate corresponding to the participation rate.

60. A computer readable recording medium on which is recorded a computer program for implementing a cooperative work supporting method for use in a system for effecting a cooperative work by cooperation of a plurality of participants at respective computer terminals connected to a computer network, said program comprising:

code for determining a participation rate, indicating a level of participation in the cooperative work, for each participant of the plurality of participants at their respective computer terminals, wherein the cooperative work is a common, single work for all the participants; and code for informing each participant of the plurality of participants at their respective computer terminal of the participation rate in an identifiable manner, wherein the participation of a participant in the cooperative work is adjusted according to the participation rate, and the adjustment of the participation in the cooperative work varies the participation rate of the participant himself, thereby inhibiting or forcing access to a predetermined cooperative work.

61. A computer readable recording medium on which is recorded a computer program for implementing a cooperative work supporting method for use in a system for effecting a cooperative work by cooperation of a plurality of participants at respective computer terminals connected to a computer network, said program comprising:

code for determining a participation rate, indicating a level of participation in the cooperative work, for each participant of the plurality of participants at their respective computer terminals, wherein the cooperative work is a common, single work for all the participants; and code for informing each participant of the plurality of participants at their respective computer terminal of the participation rate in an identifiable manner, wherein the participation of a participant in the cooperative work is adjusted according to the participation rate, and the adjustment of the participation in the cooperative work is to vary the participation rate of another participant, thereby inhibiting or forcing access to a predetermined cooperative work.

62. A computer readable recording medium according to claim 60, wherein the adjustment of the level of participation in the cooperative work is to inhibit or force write-in in a first level and to inhibit or force read-out in a second level.

63. A computer readable recording medium according to claim 43, wherein said program further comprises code for presenting, to each participant of the plurality of participants, a prompt requesting adjustment of a respective participation rate thereof.

* * * * *

UNITED STATES PATENT AND TRADEMARK OFFICE
CERTIFICATE OF CORRECTION

PATENT NO. : 6,038,543

DATED : March 14, 2000

INVENTOR(S) : TAKAHIRO KUROSAWA

Page 1 of 2

It is certified that error appears in the above-identified patent and that said Letters Patent is hereby corrected as shown below:

[57] ABSTRACT

Line 3, "of the" should read --or the--.

COLUMN 1

Line 19, "to" should read --do--.
Line 66, "a" should read --of a--.

COLUMN 3

Line 17, "work" should read --work,--.

COLUMN 4

Line 22, "in" (second occurrence) should read --in a--.
Line 62, "incase" should read --increase--.

UNITED STATES PATENT AND TRADEMARK OFFICE
CERTIFICATE OF CORRECTION

PATENT NO. : 6,038,543
DATED : March 14, 2000
INVENTOR(S) : TAKAHIRO KUROSAWA

It is certified that error appears in the above-identified patent and that said Letters Patent is hereby corrected as shown below:

COLUMN 5

Line 32, "in" should read --in a--.
   Line 43, "frame" should read --frames--.

COLUMN 11

Line 34, "informing" should read --informing means--.

Signed and Sealed this

Twenty-fourth Day of April, 2001

Attest:

NICHOLAS P. GODICI

Attesting Officer     Acting Director of the United States Patent and Trademark Office